United States Patent
Parnin et al.

(10) Patent No.: US 12,270,336 B1
(45) Date of Patent: Apr. 8, 2025

(54) FAN DRIVE GEAR SYSTEM ROTATING OIL BAFFLE

(71) Applicant: RTX CORPORATION, Farmington, CT (US)

(72) Inventors: Francis Parnin, Suffield, CT (US); Mark A. Klein, Columbus, OH (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/370,515

(22) Filed: Sep. 20, 2023

(51) Int. Cl.
*F02C 7/06* (2006.01)
*F02C 7/36* (2006.01)

(52) U.S. Cl.
CPC ............... *F02C 7/06* (2013.01); *F02C 7/36* (2013.01); *F05D 2220/36* (2013.01); *F05D 2260/40311* (2013.01); *F05D 2260/98* (2013.01)

(58) Field of Classification Search
CPC .......... F02C 7/06; F02C 7/36; F05D 2220/36; F05D 2260/40311; F05D 2260/98
See application file for complete search history.

(56) References Cited

U.S. PATENT DOCUMENTS

| | | | | |
|---|---|---|---|---|
| 5,107,676 | A | * | 4/1992 | Hadaway ............ F16H 57/0482 60/39.08 |
| 8,484,942 | B1 | * | 7/2013 | McCune ................. F01D 25/18 384/473 |
| 8,893,469 | B2 | * | 11/2014 | DiBenedetto ............. F02C 7/36 184/6.12 |
| 9,404,420 | B2 | * | 8/2016 | Gallet ................. F16H 57/0456 |
| 10,041,489 | B2 | * | 8/2018 | Parnin ....................... F02C 7/06 |
| 10,513,949 | B2 | * | 12/2019 | Parnin ................. F16H 57/0442 |
| 11,326,555 | B2 | | 5/2022 | Uhkoetter et al. |
| 2021/0222767 | A1 | * | 7/2021 | Jabido .................... F16H 57/082 |
| 2022/0316584 | A1 | | 10/2022 | Jacquemard et al. |

* cited by examiner

*Primary Examiner* — Lorne E Meade
(74) *Attorney, Agent, or Firm* — Carlson, Gaskey & Olds, P.C.

(57) ABSTRACT

A fan drive gear system for a turbine engine includes a sun gear that is configured to be driven by an engine shaft that is rotatable about an axis, a plurality of intermediate gears that are intermeshed with the sun gear, a ring gear assembly that is engaged with the plurality of intermediate gears, the ring gear is configured for attachment to a static structure, a carrier that supports rotation of the plurality of intermediate gears, the carrier configured for rotation about the axis, at least one baffle that is attached to the carrier that is configured to impart a momentum on expelled lubricant, a fixed gutter that is disposed radially outside the at least one baffle and is configured to receive lubricant that is exhausted from the at least one baffle, and a fan shaft that is rotatable about the axis and configured to be driven by the carrier.

18 Claims, 5 Drawing Sheets

FAN DRIVE GEAR SYSTEM ROTATING OIL BAFFLE

TECHNICAL FIELD

The present disclosure relates generally to an aircraft propulsion system that includes a fan drive gear system.

BACKGROUND

A turbine engine typically includes a fan section, a compressor section, a combustor section, and a turbine section. A speed reduction device such as an epicyclical gear assembly may be utilized to drive the fan section such that the fan section may rotate at a speed different than the turbine section so as to increase the overall propulsive efficiency of the engine. A carrier may support a plurality of planetary gears and rotate about an engine axis. Rotation of the carrier can present challenges for recovering lubricant expelled from the gear system during operation. Turbine engine manufacturers continue to seek further improvements to engine performance including improvements to thermal, transfer and propulsive efficiencies.

SUMMARY

A fan drive gear system for a turbine engine according to an exemplary embodiment of this disclosure includes, among other possible things, a sun gear that is configured to be driven by an engine shaft that is rotatable about an axis, a plurality of intermediate gears that are intermeshed with the sun gear, a ring gear assembly that is engaged with the plurality of intermediate gears, the ring gear is configured for attachment to a static structure, a carrier that supports rotation of the plurality of intermediate gears, the carrier is configured for rotation about the axis, at least one baffle that is attached to the carrier that is configured to impart a momentum on expelled lubricant, a fixed gutter that is disposed radially outside the at least one baffle and is configured to receive lubricant that is exhausted from the at least one baffle, and a fan shaft that is rotatable about the axis and configured to be driven by the carrier.

In a further embodiment of the foregoing fan drive gear system, the at least one baffle includes a plurality of openings that extend through a radially facing outer wall.

In a further embodiment of any of the fan drive gear systems, the fixed gutter includes an annular channel for receiving oil from the at least one baffle and a seal surface. A seal is attached to the at least one baffle and seals against the seal surface.

In a further embodiment of any of the fan drive gear systems, the fixed gutter includes at least one outlet for communicating oil to an auxiliary lubrication system.

In a further embodiment of any of the fan drive gear systems, the carrier includes a forward face and an aft face and the at least one baffle includes a forward baffle that is attached to the forward face and an aft baffle that is attached to the aft face. The fixed gutter includes a forward gutter that is radially outside the forward baffle and an aft gutter that is radially outside the aft baffle.

In a further embodiment of any of the fan drive gear systems, the forward gutter and the aft gutter each include a channel where oil is received from a corresponding one of the forward baffle and the aft baffle and a sealing surface for generating a seal with a seal that is attached to a corresponding one of the forward baffle and the aft baffle.

In a further embodiment of any of the fan drive gear systems, the channel is annular about the axis and includes a "V" shape in cross-section.

In a further embodiment of any of the fan drive gear systems, each of the forward gutter and the aft gutter includes an outlet for communicating oil to an auxiliary reservoir.

In a further embodiment of any of the fan drive gear systems, each of the forward baffle and the aft baffle includes a radially inward extending capture portion and an annular accumulation portion. Captured lubricant is directed radially outward by the capture portion into the accumulation portion where a circumferential momentum is imparted into the lubricant.

In a further embodiment of any of the fan drive gear systems, the outlet extends tangential to an outer radial surface to a corresponding one of the forward gutter and the aft gutter to conserve momentum that is generated in the lubricant by a corresponding one of the forward and aft baffles.

In a further embodiment of any of the fan drive gear systems, each of the intermediate gears is supported by a journal bearing that is supported within the carrier and lubricant expelled from each of the journal bearings is directed through the at least one baffle.

A turbine engine assembly according to an exemplary embodiment of this disclosure includes, among other possible things, a static engine structure, a fan section that includes a fan shaft that is coupled to a hub that supports a plurality of blades that are rotatable about an axis, a fan drive gear system that includes a sun gear that is configured to be driven by an engine shaft that is rotatable about the axis, a plurality of intermediate gears, a ring gear assembly that is fixed to the engine static structure, a carrier that supports rotation of the plurality of intermediate gears, the carrier is rotatable about the axis and coupled to drive the fan shaft, and a forward baffle that is attached to a forward face of the carrier and configured to impart a momentum on lubricant that is expelled forward of the gear system. An aft baffle is attached to an aft face of the carrier and configured to impart moment on lubricant that is expelled aft of the gear system. A forward gutter is disposed radially outside the forward baffle and fixed to the engine static structure, the forward gutter is configured to receive lubricant that is exhausted from the forward baffle. An aft gutter is disposed radially outside the aft baffle and fixed to the engine static structure, the aft gutter is configured to receive lubricant that is exhausted from the forward baffle. A primary lubricant system communicates lubricant to the fan drive gear system, and an auxiliary lubricant system includes an auxiliary reservoir that is configured to receive lubricant that is expelled from the fan drive gear system and communicated through the fixed gutter.

In a further embodiment of the foregoing turbine engine assembly, the forward gutter and the aft gutter each include a channel where lubricant is received from a corresponding one of the forward baffle and the aft baffle and a sealing surface for generating a seal with a seal that is attached to a corresponding one of the forward baffle and the aft baffle.

In a further embodiment of any of the foregoing turbine engine assemblies, each of the forward baffle and the aft baffle includes a radially inward extending capture portion and an annular accumulation portion. Captured lubricant is directed radially outward by the capture portion into the accumulation portion where a circumferential momentum is imparted into the lubricant.

In a further embodiment of any of the foregoing turbine engine assemblies, the accumulation portion includes an axial length that corresponds with an axial length of the channel of a corresponding one of the forward gutter and the aft gutter.

In a further embodiment of any of the foregoing turbine engine assemblies, the channel is annular about the axis and includes a "V" shape in cross-section.

In a further embodiment of any of the foregoing turbine engine assemblies, each of the forward gutter and the aft gutter includes an outlet for communicating lubricant to the auxiliary reservoir. The outlet extends tangential to an outer radial surface to a corresponding one of the forward gutter and the aft gutter to conserve momentum that is generated in the lubricant by a corresponding one of the forward and aft baffles.

A lubrication system for a gas turbine engine according to an exemplary embodiment of this disclosure includes, among other possible things, a forward baffle that is configured for attachment to a forward face of a rotating carrier and configured to impart a momentum on lubricant that is expelled forward of a fan drive gear system. An aft baffle is configured for attachment to an aft face of the rotating carrier and configured to impart moment on lubricant that is expelled aft of the fan drive gear system. A forward gutter is disposed radially outside the forward baffle and configured to be fixed to an engine static structure, the forward gutter is configured to receive lubricant that is exhausted from the forward baffle. An aft gutter is disposed radially outside the aft baffle and configured to be fixed to the engine static structure, the aft gutter is configured to receive lubricant that is exhausted from the forward baffle. A primary lubricant system communicates lubricant to the fan drive gear system, and an auxiliary lubricant system includes an auxiliary reservoir that is configured to receive lubricant that is expelled from the fan drive gear system and communicated through the fixed gutter.

In a further embodiment of the foregoing lubrication system, each of the forward baffle and the aft baffle includes a radially inward extending capture portion and an annular accumulation portion. Captured lubricant is directed radially outward by the capture portion into the accumulation portion where a circumferential momentum is imparted into the lubricant.

In a further embodiment of any of the foregoing lubrication systems, each of the forward gutter and the aft gutter includes an outlet for communicating lubricant to the auxiliary reservoir, the outlet extends tangential to an outer radial surface to a corresponding one of the forward gutter and the aft gutter to conserve momentum that is generated in the lubricant by a corresponding one of the forward and aft baffles.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
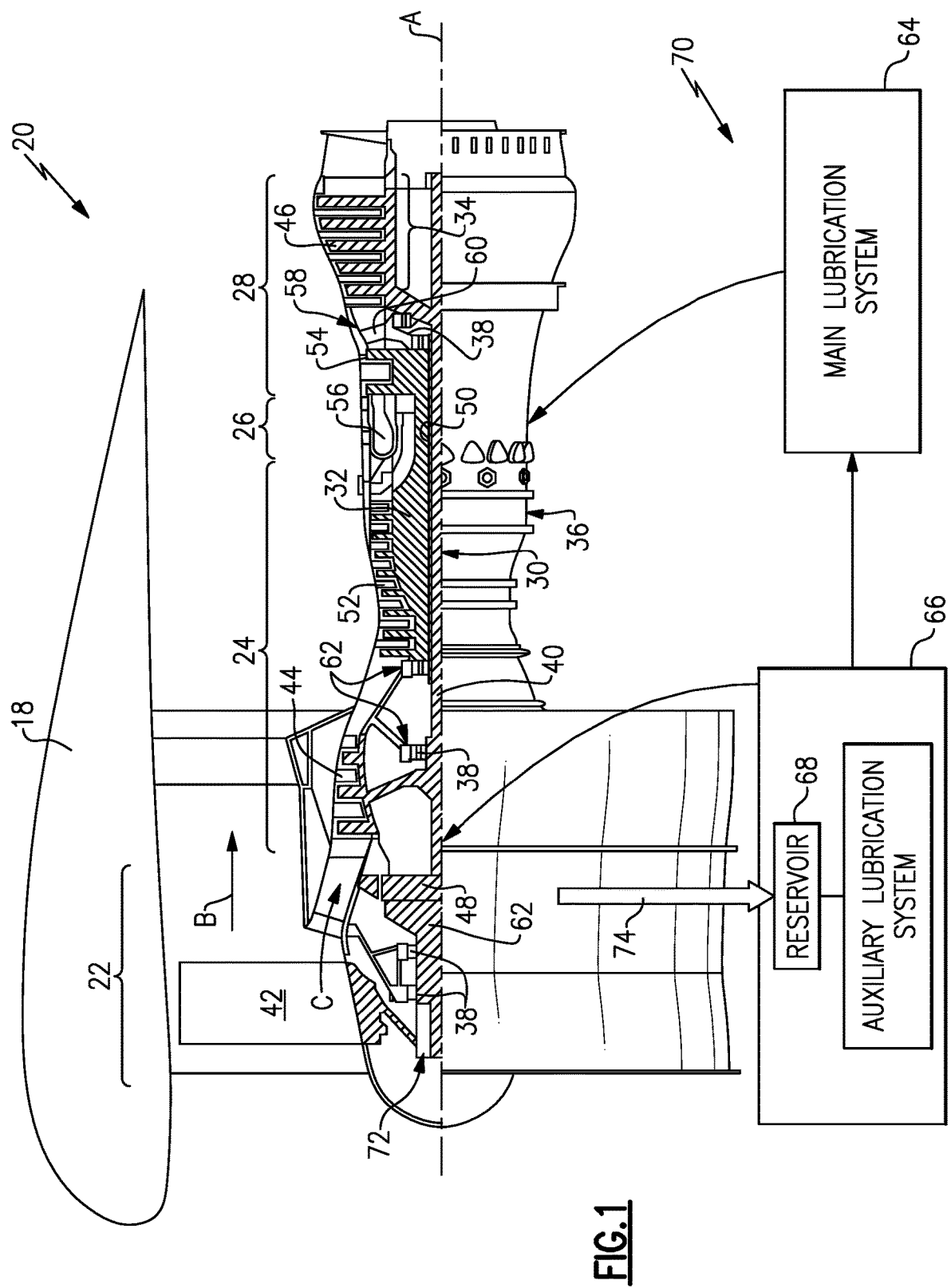
FIG. 1 is a schematic view of an example gas turbine engine including a planetary fan drive gear system.

FIG. 1 schematically illustrates a gas turbine engine 20 with an epicyclic fan drive gear system 48 having a rotating carrier with rotating lubricant baffles for capturing and directing expelled lubricant to an auxiliary reservoir.

The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans, turboprop, open rotor configurations and any other gas turbine engine architecture.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. the example engine 20 includes a bypass ratio greater than 20, with an example embodiment being greater than 32 and less than 72. Moreover, although the example turbine engine 20 is shown with the fan section 22 disposed within the nacelle 18, a turboprop engine is also within contemplation and scope of this disclosure.

The fan drive gear system 48 is an epicycle gear train with a gear reduction ratio of greater than about 5:1 and less than about 18:1. In another example embodiment, the fan drive gear system 48 provides a gear reduction ratio of between 8:1 and 13.5:1. The gear system 48 is coupled to the fan shaft 62 that is coupled to a hub 72 supporting a plurality of fan blades 42. The gear system 48 drives the fan blades 42 about the engine axis A. It should be understood, however, that the above parameters are only exemplary of one embodiment of a geared engine architecture and that the present disclosure is applicable to other gas turbine engine architectures including turbofan, turboshaft, and open rotor engines.

The example engine 20 includes a lubrication system 70 with a main lubrication system 64 and an auxiliary lubrication system 66. The auxiliary lubrication system 66 includes a reservoir 68 that receives lubricant expelled from the fan drive gear system 48. Lubricant from the auxiliary lubrication system 66 may be fed back to the main lubrication system and/or fed back to the gear system 48.

Figure 2:
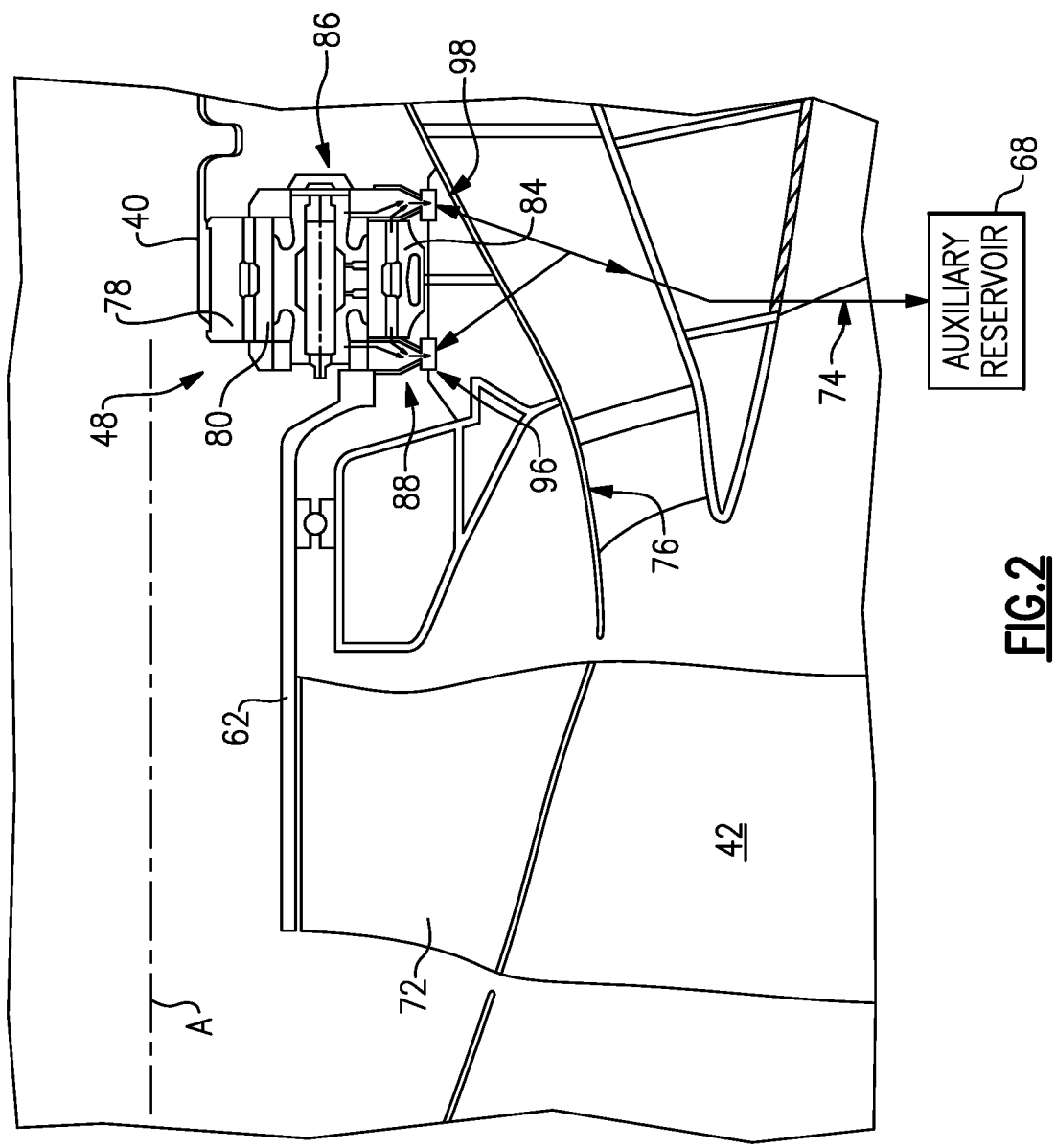
FIG. 2 is a schematic view of an example fan drive gear system.
Figure 3:
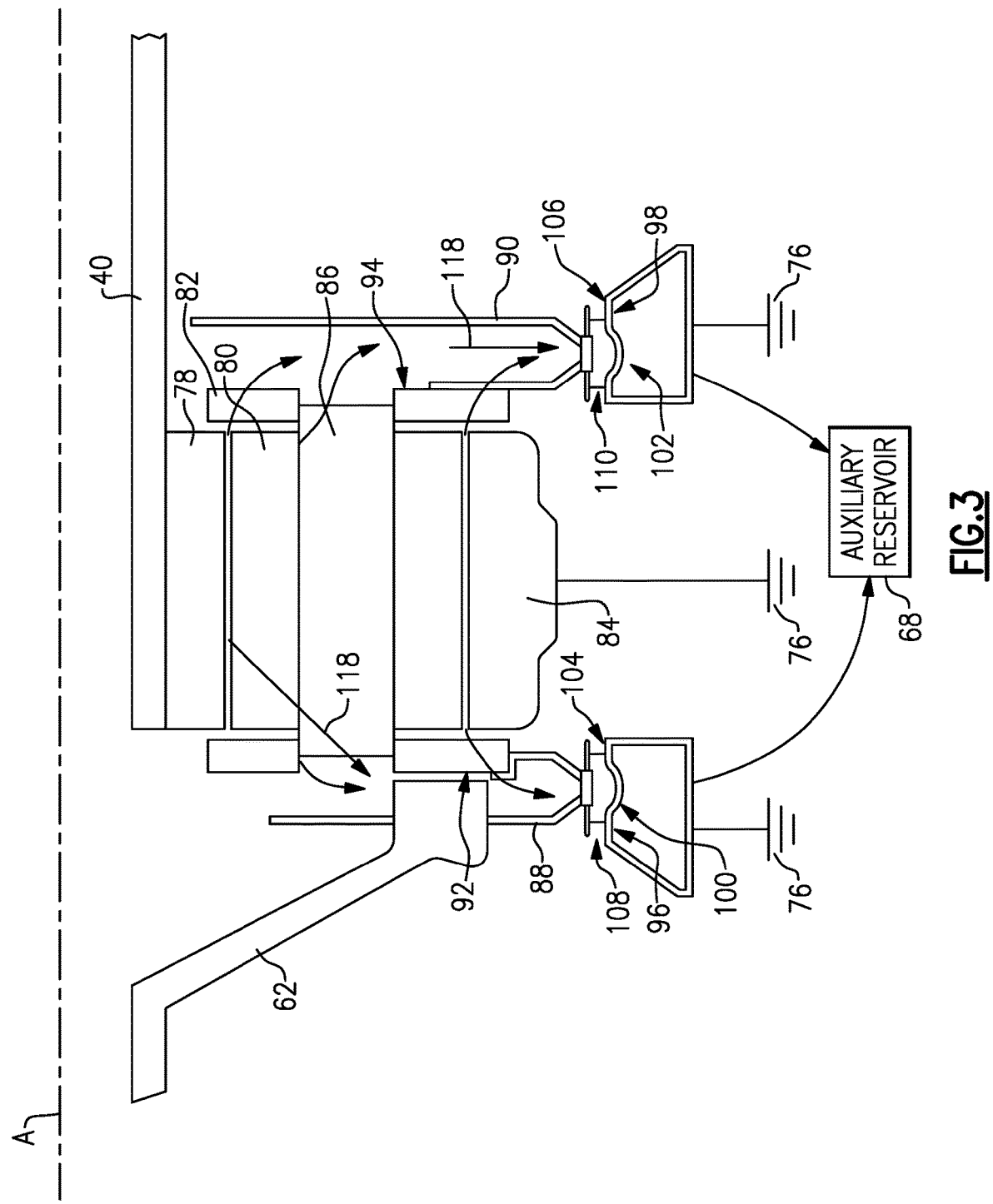
FIG. 3 is a schematic view of a lubricant recovery system of the example fan drive gear system.

Referring to FIGS. 2 and 3 with continued reference to FIG. 1, the example fan drive gear system 48 is an epicyclic gear system with a sun gear 78 coupled to a portion of the low shaft 40 and engaged to a plurality of intermediate gears 80 supported on a corresponding journal bearing 86 within a rotating carrier 82. A ring gear 84 circumscribes the intermediate gears 80 and is fixed to a static engine structure 76.

The fan shaft 62 is coupled to the carrier 82 and extends radially inward and forward of the gear system 48 to the fan hub 72 (FIG. 2). Lubricant is supplied to the gear system 48 from the main lubrication system 64. Lubricant is communicated to each gear interface and to the bearing surfaces between the journal bearings 86 and the intermediate gears 80. Lubricant is then expelled forward and aft of the gear system 48 into one of a forward rotating baffle 88 and an aft rotating baffle 90. The forward rotating baffle 88 is attached to the forward face 92 of the carrier 82 and the aft rotating baffle 90 is attached to the aft face 94 of the carrier 82. The forward and aft baffles 88, 90 direct lubricant into a corresponding one of a forward static gutter 96 and an aft static gutter 98.

Centrifugal forces impart radially outward momentum on expelled lubricant. The outward momentum drives expelled lubricant, schematically shown at 118, radially outward in each of the baffles 88, 90. The baffles 88, 90 rotate with the carrier 82 and further impart radially outward momentum that drives lubricant radially outward toward the forward and aft gutters 96, 98.

The forward and aft gutters 96, 98 are fixed relative to the rotation of the rotating baffles 88, 90. A seal is provided between the fixed and rotating parts to contain the expelled lubricant. In one example embodiment, the forward and aft gutters 96, 98 include a corresponding channel 100, 102 and seal surfaces 104, 106. A forward seal 108 rotates with the forward baffle 88 and engages the forward seal surface 104. An aft seal 110 rotates with the aft baffle 90 and engages the aft seal surface 106. In one example embodiment, the forward and aft seals 108 and 110 each include seal members disposed on either side of the corresponding channel 100, 102.

Figure 4:
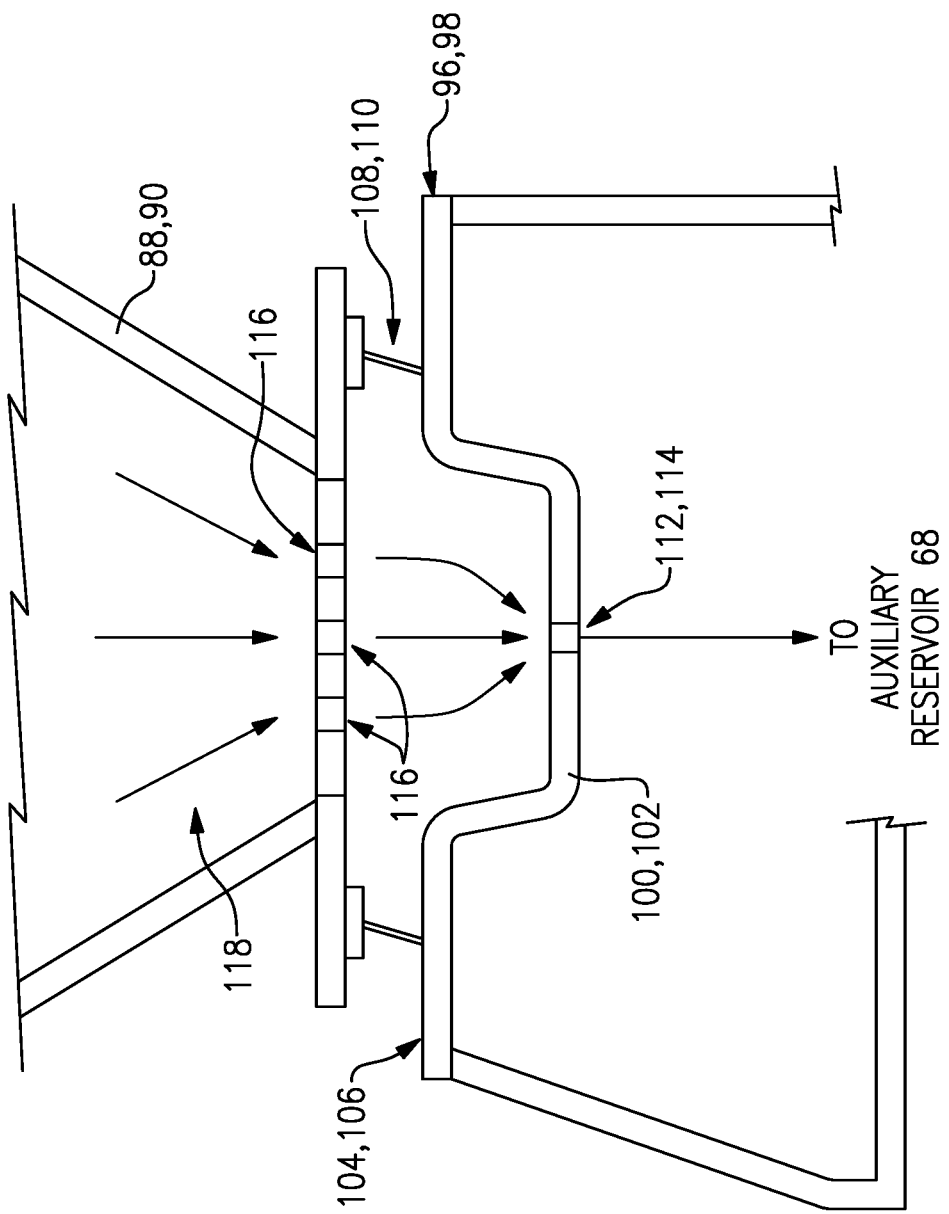
FIG. 4 is an enlarged schematic view of an interface between a rotating baffle and a static gutter.

Referring to FIG. 4, with continued reference to FIG. 3, an example interface between the rotating baffles 88, 90 and the fixed gutters 96, 98 is schematically shown. Each of the rotating baffles 88, 90 includes radially facing openings 116 through which lubricant is expelled into the corresponding gutter 96, 98. Rotation of the baffles 88, 90 impart the radially outward momentum that drives lubricant into the corresponding channel 100, 102 of the corresponding gutter 96, 98. The rotating baffles 88, 90 further impart rotational momentum that carries through to lubricant built up in the annular channels 100, 102.

Figure 5:
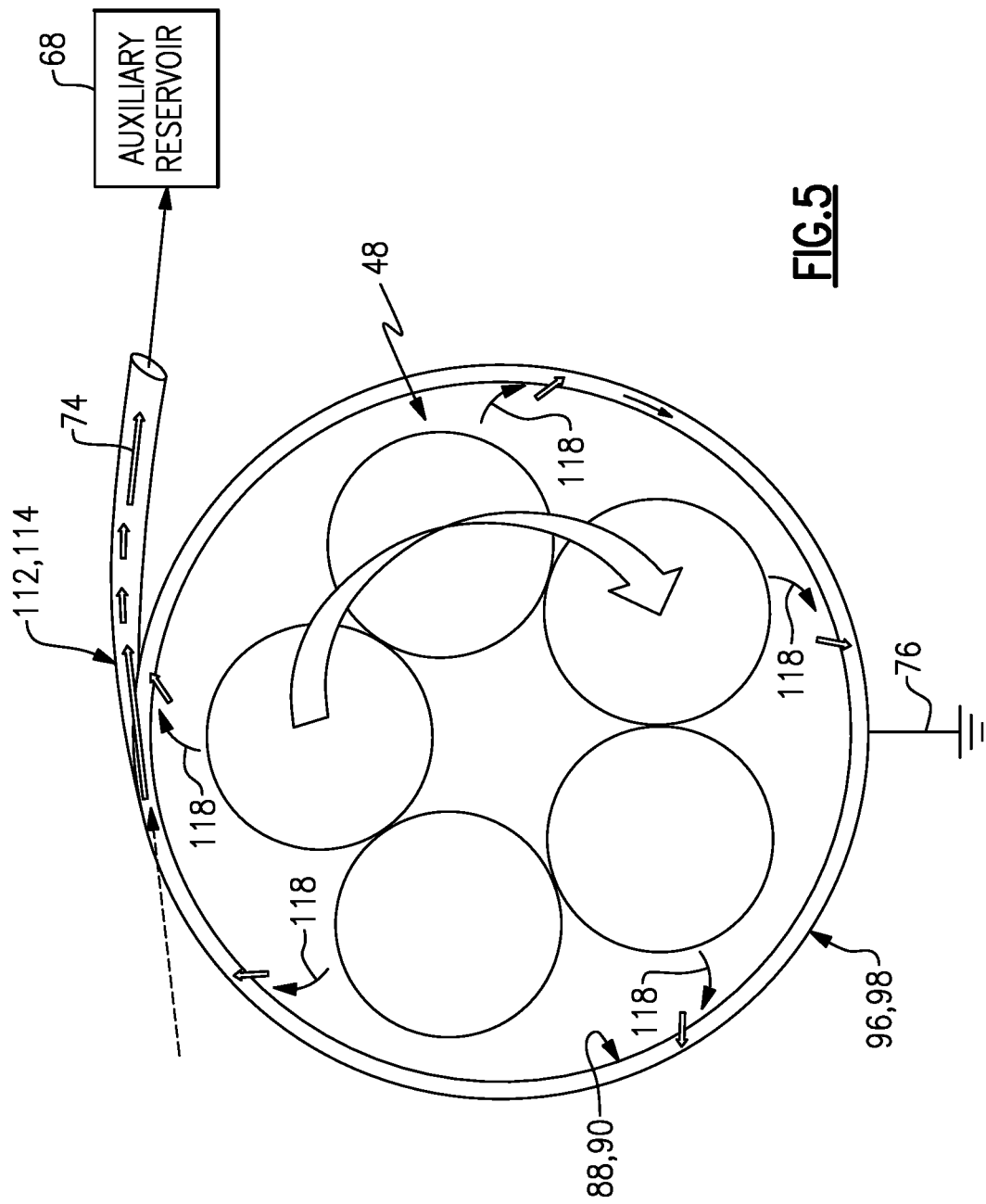
FIG. 5 is a schematic view of the example fan drive gear system illustrating an example lubricant flow embodiment.

Referring to FIG. 5, with continued reference to FIGS. 3 and 4, a schematic view of the example gear system 48, baffles 88, 90 and gutters 96, 98 illustrates the rotational momentum of lubricant 118. The expelled lubricant 118 has both rotational and radially outward momentum that drives lubricant flow into the radially outer gutters 96, 98. The rotational momentum of the lubricant 118 drives lubricant flow circumferentially about the gutters 96, 98 toward the corresponding outlet 112, 114. In one disclosed example, the outlet 112, 114 is tangential to the corresponding gutter 96, 98 such that the expelled lubricant 74 has sufficient momentum to be propelled and/or drain into the auxiliary reservoir 68.

The forward and aft gutters 96, 98 may have separate outlets 112, 114 that each lead to the reservoir 68. The outlets 112, 114 may also be combined into a single passage that communicates the expelled lubricant flow to the auxiliary reservoir 68.

In one example operational embodiment, lubricant 118 is expelled from the rotating carrier 82 forward and aft of the gear system 48. The baffles 88, 90 are attached to the carrier 82 and therefore rotate with the carrier 82. Lubricant expelled by the carrier 82 has both circumferential and radially outward momentum and is captured and directed into a corresponding one of the baffles 88, 90. Because the baffles 88, 90 are also rotating, further rotational and radially outward momentum is imparted on the lubricant flow. The radially outward momentum drives lubricant through openings 116 (FIG. 4) into the corresponding static gutter 96, 98. The rotational momentum on the lubricant carries over in to the gutters 96, 98 to drive lubricant toward and through the tangential openings 112, 114. Lubricant driven through the tangential openings 112, 114 is communicated to the auxiliary reservoir 68. From the auxiliary reservoir 68, lubricant may be directed either back to the gear system 48 and/or back to the main lubrication system 64 for recirculation back to the gear system 48 and other engine features that require lubrication.

Accordingly, the example gear system includes rotating baffles to both collect and impart momentum on lubricant to drive the expelled lubricant away from the gear system and to the auxiliary reservoir.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbine engine comprising:
- a sun gear configured to be driven by an engine shaft rotatable about an axis;
- a plurality of intermediate gears intermeshed with the sun gear;
- a ring gear assembly engaged with the plurality of intermediate gears, the ring gear configured for attachment to a static structure;
- a carrier supporting rotation of the plurality of intermediate gears, the carrier is configured for rotation about the axis;
- at least one baffle attached to the carrier configured to impart a momentum on expelled lubricant;
- a fixed gutter disposed radially outside the at least one baffle and configured to receive lubricant exhausted from the at least one baffle, wherein the fixed gutter includes an annular channel for receiving oil from the at least one baffle and a seal surface, wherein a seal is attached to the at least one baffle and seals against the seal surface; and
- a fan shaft rotatable about the axis and configured to be driven by the carrier.

2. The fan drive gear system as recited in claim 1, wherein the at least one baffle includes a plurality of openings extending through a radially facing outer wall.

3. The fan drive gear system as recited in claim 1, wherein the fixed gutter includes at least one outlet for communicating oil to an auxiliary lubrication system.

4. The fan drive gear system as recited in claim 1, wherein the carrier includes a forward face and an aft face and the at least one baffle comprises a forward baffle attached to the forward face and an aft baffle attached to the aft face, and wherein the fixed gutter comprises a forward gutter radially outside the forward baffle and an aft gutter radially outside the aft baffle.

5. The fan drive gear system as recited in claim 1, wherein each of the intermediate gears is supported by a journal bearing supported within the carrier and lubricant expelled from each of the journal bearings is directed through the at least one baffle.

6. A fan drive gear system for a turbine engine comprising:
- a sun gear configured to be driven by an engine shaft rotatable about an axis;
- a plurality of intermediate gears intermeshed with the sun gear;
- a ring gear assembly engaged with the plurality of intermediate gears, the ring gear configured for attachment to a static structure;
- a carrier supporting rotation of the plurality of intermediate gears, the carrier is configured for rotation about the axis, wherein the carrier includes a forward face and an aft face;
- at least one baffle attached to the carrier configured to impart a momentum on expelled lubricant, wherein the at least one baffle comprises a forward baffle attached to the forward face and an aft baffle attached to the aft face;
- a fixed gutter disposed radially outside the at least one baffle and configured to receive lubricant exhausted from the at least one baffle, wherein the fixed gutter comprises a forward gutter radially outside the forward baffle and an aft gutter radially outside the aft baffle; and
- a fan shaft rotatable about the axis and configured to be driven by the carrier, wherein the forward gutter and the aft gutter each include a channel where oil is received from a corresponding one of the forward baffle and the aft baffle and a sealing surface for generating a seal with a seal attached to a corresponding one of the forward baffle and the aft baffle.

7. The fan drive gear system as recited in claim 6, wherein the channel is annular about the axis and comprises a "U" shape in cross-section.

8. The fan drive gear system as recited in claim 6, wherein each of the forward gutter and the aft gutter includes an outlet for communicating oil to an auxiliary reservoir.

9. The fan drive gear system as recited in claim 8, wherein the outlet extends tangential to an outer radial surface to a corresponding one of the forward gutter and the aft gutter to conserve momentum generated in the lubricant by a corresponding one of the forward and aft baffles.

10. The fan drive gear system as recited in claim 6, wherein each of the forward baffle and the aft baffle includes a radially inward extending capture portion and an annular accumulation portion, wherein captured lubricant is directed radially outward by the capture portion into the annular accumulation portion where a circumferential momentum is imparted into the captured lubricant.

11. A turbine engine assembly comprising:
- a static engine structure;
- a fan section including a fan shaft coupled to a hub supporting a plurality of blades rotatable about an axis;
- a fan drive gear system including;
    - a sun gear configured to be driven by an engine shaft rotatable about the axis, a plurality of intermediate gears;
    - a ring gear assembly fixed to the engine static structure;
    - a carrier supporting rotation of the plurality of intermediate gears, the carrier rotatable about the axis and coupled to drive the fan shaft; and
    - a forward baffle attached to a forward face of the carrier and configured to impart a momentum on lubricant expelled forward of the fan drive gear system;
    - an aft baffle attached to an aft face of the carrier and configured to impart moment on lubricant expelled aft of the fan drive gear system;
    - a forward gutter disposed radially outside the forward baffle and fixed to the engine static structure, the forward gutter configured to receive lubricant exhausted from the forward baffle;
    - an aft gutter disposed radially outside the aft baffle and fixed to the engine static structure, the aft gutter configured to receive lubricant exhausted from the aft baffle, wherein the forward gutter and the aft gutter each include a channel where lubricant is received from a corresponding one of the forward baffle and the aft baffle and a sealing surface for generating a seal with a seal attached to a corresponding one of the forward baffle and the aft baffle;
- a primary lubricant system communicating lubricant to the fan drive gear system; and
- an auxiliary lubricant system including an auxiliary reservoir configured to receive lubricant expelled from the fan drive gear system and communicated through at least one of the forward gutter and the aft gutter.

12. The turbine engine assembly as recited in claim 11, wherein each of the forward baffle and the aft baffle includes a radially inward extending capture portion and an annular accumulation portion, wherein captured lubricant is directed radially outward by the capture portion into the accumulation portion where a circumferential momentum is imparted into the lubricant.

13. The turbine engine as recited in claim 12, wherein the accumulation portion includes an axial length that corresponds with an axial length of the channel of a corresponding one of the forward gutter and the aft gutter.

14. The turbine engine assembly as recited in claim 11, wherein the channel is annular about the axis and comprises a "U" shape in cross-section.

15. The turbine engine assembly as recited in claim 11, wherein each of the forward gutter and the aft gutter includes an outlet for communicating lubricant to the auxiliary reservoir, the outlet extends tangential to an outer radial surface to a corresponding one of the forward gutter and the aft gutter to conserve momentum generated in the lubricant by a corresponding one of the forward and aft baffles.

16. A lubrication system for a gas turbine engine comprising:
a forward baffle configured for attachment to a forward face of a rotating carrier and configured to impart a momentum on lubricant expelled forward of a fan drive gear system;
an aft baffle configured for attachment to an aft face of the rotating carrier and configured to impart moment on lubricant expelled aft of the fan drive gear system;
a forward gutter disposed radially outside the forward baffle and configured to be fixed to an engine static structure, the forward gutter configured to receive lubricant exhausted from the forward baffle;
an aft gutter disposed radially outside the aft baffle and configured to be fixed to the engine static structure, the aft gutter configured to receive lubricant exhausted from the aft baffle, wherein at least one of the forward gutter and the aft gutter include a channel where lubricant is received from a corresponding one of the forward baffle and the aft baffle and a sealing surface for generating a seal with a seal attached to a corresponding one of the forward baffle and the aft baffle;
a primary lubricant system communicating lubricant to the fan drive gear system; and
an auxiliary lubricant system including an auxiliary reservoir configured to receive lubricant expelled from the fan drive gear system and communicated through at least one of the forward gutter and the aft gutter.

17. The lubrication system as recited in claim 16, wherein each of the forward baffle and the aft baffle includes a radially inward extending capture portion and an annular accumulation portion, wherein captured lubricant is directed radially outward by the capture portion into the annular accumulation portion where a circumferential momentum is imparted into the captured lubricant.

18. The lubrication system as recited in claim 17, wherein each of the forward gutter and the aft gutter includes an outlet for communicating lubricant to the auxiliary reservoir, the outlet extends tangential to an outer radial surface to a corresponding one of the forward gutter and the aft gutter to conserve momentum generated in the lubricant by a corresponding one of the forward and aft baffles.

\* \* \* \* \*